(12) United States Patent
Takahashi

(10) Patent No.: US 6,542,544 B1
(45) Date of Patent: Apr. 1, 2003

(54) METHOD AND APPARATUS FOR DETECTING FADE OF IMAGE IN A VIDEO SIGNAL

(75) Inventor: Tsutomu Takahashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/365,027

(22) Filed: Aug. 2, 1999

(30) Foreign Application Priority Data

Aug. 6, 1998 (JP) .......................................... 10-223374

(51) Int. Cl.⁷ ................................................ H04N 7/12
(52) U.S. Cl. ............................ 375/240.03; 375/240.11; 375/240.06; 375/240.14; 382/173
(58) Field of Search ...................... 375/240.03, 240.11, 375/240.14, 240.06; 348/700, 595; 382/173

(56) References Cited

U.S. PATENT DOCUMENTS

| | | | | |
|---|---|---|---|---|
| 5,245,436 A | * | 9/1993 | Alattar | 358/182 |
| 5,686,963 A | * | 11/1997 | Uz | 348/404 |
| 5,920,360 A | * | 7/1999 | Coleman | 348/700 |
| 6,061,471 A | * | 5/2000 | Coleman | 382/173 |
| 6,084,641 A | * | 7/2000 | Wu | 348/722 |
| 6,259,733 B1 | * | 7/2001 | Kaye | 375/240 |

* cited by examiner

*Primary Examiner*—Chris Kelley
*Assistant Examiner*—Charles E. Parsons

(57) ABSTRACT

Method and apparatus for detecting fade of a video signal which can detect a fade state of an image from a video signal at a high speed. It is determined that an image based on an original video signal is in a fade state when the absolute value of the difference between the total luminance value of original video signal of one frame and the total luminance value of the neighboring video signal of one frame which are neighboring just before or after the original video signal is relatively large and the number of pixel data in which the absolute value of the difference between each pixel data in the original video signal of one frame and each pixel data in the neighboring video signal is relatively small with respect to pixels existing at the spatially same position is large.

2 Claims, 6 Drawing Sheets

METHOD AND APPARATUS FOR DETECTING FADE OF IMAGE IN A VIDEO SIGNAL

BACKGROUND OF THE INVENTION

1. Field of the Invention

The present invention relates to a fade detection by which a fade-in or fade-out state of an image is detected based on a video signal.

2. Description of Related Art

A fade detecting apparatus has been known, which uses the video signal itself for the detection of fade-in or fade-out state (hereinafter, referred to simply as a fade state) such that the luminance of a whole image gradually increases or decreases with the lapse of time.

In the fade detecting apparatus, the total luminance value of the video signal corresponding to one frame is compared with the total luminance value of the video signal corresponding to a frame which is one frame before (or after) the above frame. When a difference value between them is kept constant for a predetermined period, a determination is made that the video signal is in the fade state, and a fade detection signal is produced.

In this detecting method, there however is a problem that a real-time operation cannot be made upon detection, and the detecting method cannot be used for a high-speed image processing since the fade state can be determined only after the lapse of the predetermined period as mentioned above.

SUMMARY AND OBJECT OF THE INVENTION

The invention has been made to solve the problem and it is an object of the invention to provide fade detecting method and apparatus of a video signal, in which a fade state of an image can be detected from the video signal at a high speed.

According to the invention, there is provided a fade detecting method of a video signal for detecting a fade-in or fade-out state of an image from an original video signal constituted by a series of pixel data corresponding to pixels of a picture, comprising: a first fade discriminating step of obtaining, as a first difference absolute value, an absolute value of a difference between the total luminance value of the original video signal of one frame and the total luminance value of neighboring video signal of one frame which are neighboring just before or just after the original video signal, and discriminating whether the first difference absolute value is larger than a first predetermined value or not; a second fade discriminating step of obtaining, as a second difference absolute value, an absolute value of a difference between each pixel data in the original video signal of one frame and each pixel data in the neighboring video signal with respect to pixels existing at a spatially same position, and discriminating whether the number of pixels in which the second difference absolute value is smaller than a second predetermined value is larger than a predetermined number or not; and a fade detecting step of determining that the fade-in or fade-out has occurred on the image in the case where it is decided in the first fade discriminating step that the first difference absolute value is larger than the first predetermined value and it is determined in the second fade discriminating step that the number of pixels in which the second difference absolute value is smaller than the second predetermined value is larger than the predetermined number.

According to the invention, there is provided a fade detecting apparatus of a video signal for detecting a fade-in or fade-out state of an image from an original video signal constructed by a series of pixel data corresponding to pixels of a picture, comprising: delay means for delaying the original video signal by one frame period and obtaining a delayed original video signal; first subtracting means for obtaining, as a first difference absolute value, an absolute value of a difference between the total luminance value of the original video signal of one frame and the total luminance value of the delayed original video signal; first comparing means for comparing whether the first difference absolute value is larger than a first predetermined value or not; second subtracting means for obtaining, as a second difference absolute value, an absolute value of a difference between each pixel data in the original video signal of one frame and each pixel data in the delayed original video signal with respect to pixels existing at a spatially same position; second comparing means for detecting that the second difference absolute value is smaller than a second predetermined value; counting means for counting the number of pixels in which it is detected by the second comparing means that the second difference absolute value is smaller than the second predetermined value and obtaining a count value; third comparing means for comparing whether the count value is larger than a predetermined number or not; and means for generating a fade detection signal indicating that the fade-in or fade-out has occurred on the image when it is determined by the first comparing means that the first difference absolute value is larger than the first predetermined value and it is determined by the third comparing means that the count value is larger than the predetermined number.

DETAILED DESCRIPTION OF THE PREFERRED EMBODIMENT

Figure 1:
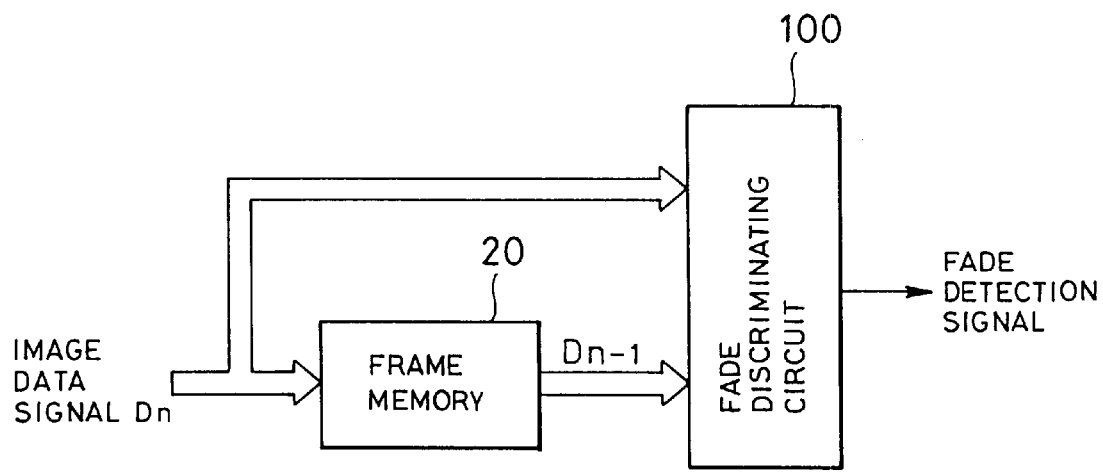
FIG. 1 is a diagram schematically showing the construction of a fade detecting apparatus embodied on the basis of a method of detecting fade of a video signal according to the invention.

FIG. 1 is a diagram schematically showing the construction of a fade detecting apparatus embodied based on a method of detecting fade of a video signal according to the invention.

In FIG. 1, a video data $D_n$ constructed by a series of pixel data samples each corresponding to each pixel on a display picture is sequentially written into a frame memory 20 every pixel data sample. When the writing of the signals of one frame is finished, the signals are read out from the frame memory 20 in accordance with the writing order. That is, the frame memory 20 delays the video data $D_n$ by one frame period and generates the delayed signal. A delayed video data $D_{n-1}$ delayed by one frame period by the frame memory 20 and read out therefrom is supplied to a fade discriminating circuit 100. The video data $D_n$ and delayed video data $D_{n-1}$ which is one frame before the video data $D_n$ are supplied to the fade discriminating circuit 100.

Figure 2:
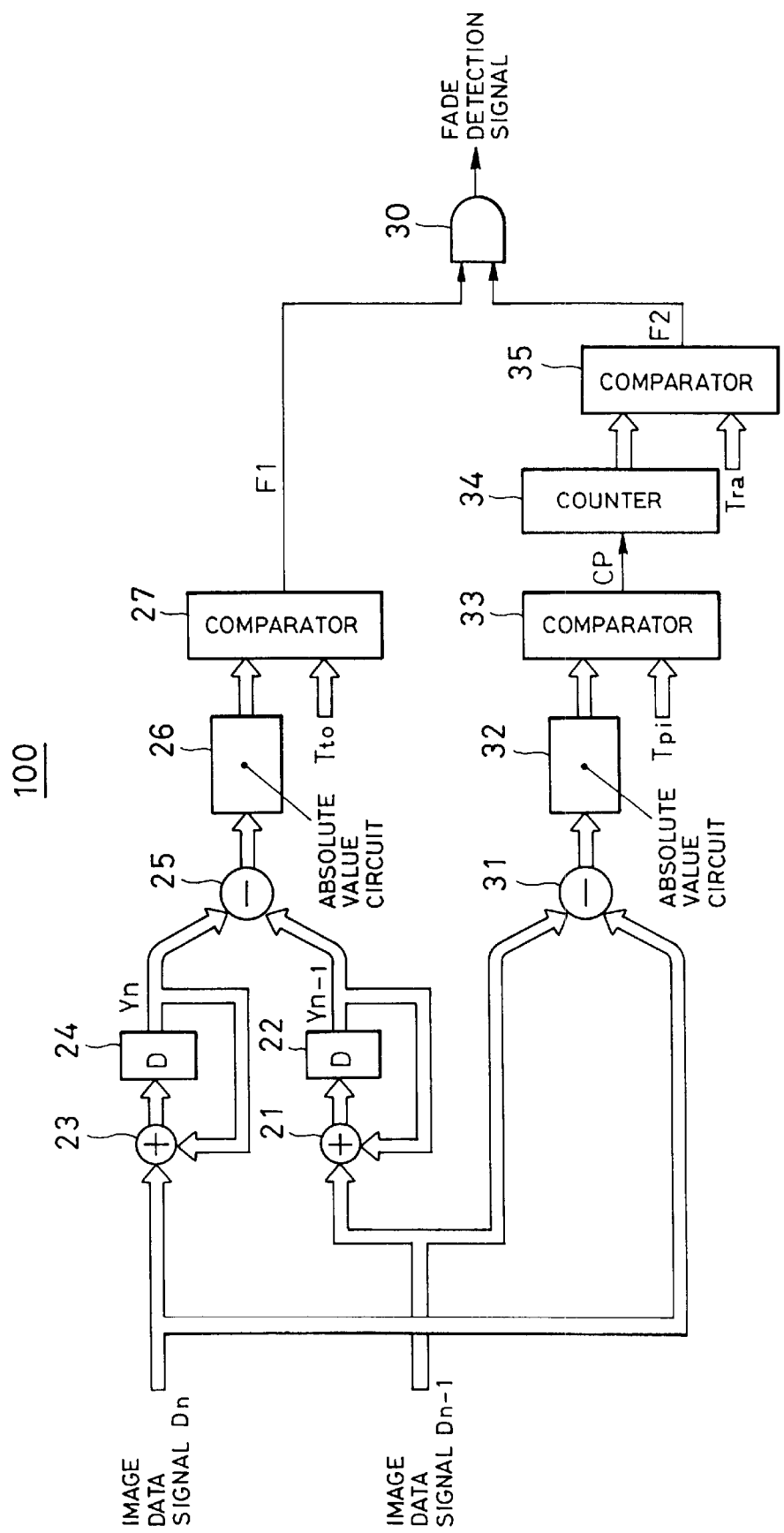
FIG. 2 is a diagram showing an internal construction of a fade discriminating circuit 100.

FIG. 2 is a diagram showing an example of an internal construction of the fade discriminating circuit 100.

In FIG. 2, a first accumulation adding circuit comprising an adder 21 and a D flip-flop 22 accumulates and adds the pixel data samples in the delayed video data $D_{n-1}$, thereby obtaining the sum of luminance values. In this instance, the storage contents of the D flip-flop 22 are reset each time the pixel data samples of one frame are accumulated and added. The sum of the luminance values which is finally obtained by the first accumulation adding circuit is, therefore, equal to the total luminance value of one frame of the image in the delayed video data $D_{n-1}$ and it is generated as a total luminance value $Y_{n-1}$ from the D flip-flop 22. A second accumulation adding circuit comprising an adder 23 and a D flip-flop 24 accumulates and adds the pixel data samples in the video data $D_n$, thereby obtaining the sum of luminance values. In this instance, the storage contents of the D flip-flop 24 are reset each time the pixel data samples of one frame are accumulated and added. The sum of the luminance values which is finally obtained by the second accumulation adding circuit is, therefore, equal to the total luminance value of one frame of the image in the video data $D_n$ and it is generated as a total luminance value $Y_n$ from the D flip-flop 24. A subtractor 25 obtains a difference value between the total luminance values $Y_n$ and $Y_{n-1}$ and supplies it to an absolute value circuit 26. The absolute value circuit 26 supplies the absolute value of the difference value to a comparator 27. The comparator 27 compares whether the absolute value of the difference between the total luminance values $Y_n$ and $Y_{n-1}$ is larger than a predetermined value $T_{to}$ or not. When it is larger than $T_{to}$, the comparator 27 generates a first fade discrimination signal F1 at the logic level "1". When it is smaller, the comparator 27 generates the first fade discrimination signal F1 at the logic level "0". The comparator supplies the signal F1 to an AND gate circuit 30.

That is, with the construction comprising the first and second accumulation adding circuits, subtractor 25, absolute value circuit 26, and comparator 27, the absolute value of the difference between the total luminance value $Y_n$ of the video data $D_n$ in the nth frame and the total luminance value $Y_{n-1}$ of the delayed video data $D_{n-1}$ in the (n−1)th frame is obtained, and the first fade discrimination signal F1 at the logic level "1" is generated only when the absolute value is larger than the predetermined value $T_{to}$.

A subtractor 31 sequentially obtains a difference value between each pixel data sample in the video data $D_n$ and each pixel data sample in the delayed video data $D_{n-1}$ which is one-frame preceding to the video data $D_n$, and supplies it to an absolute value circuit 32.

Figure 3:
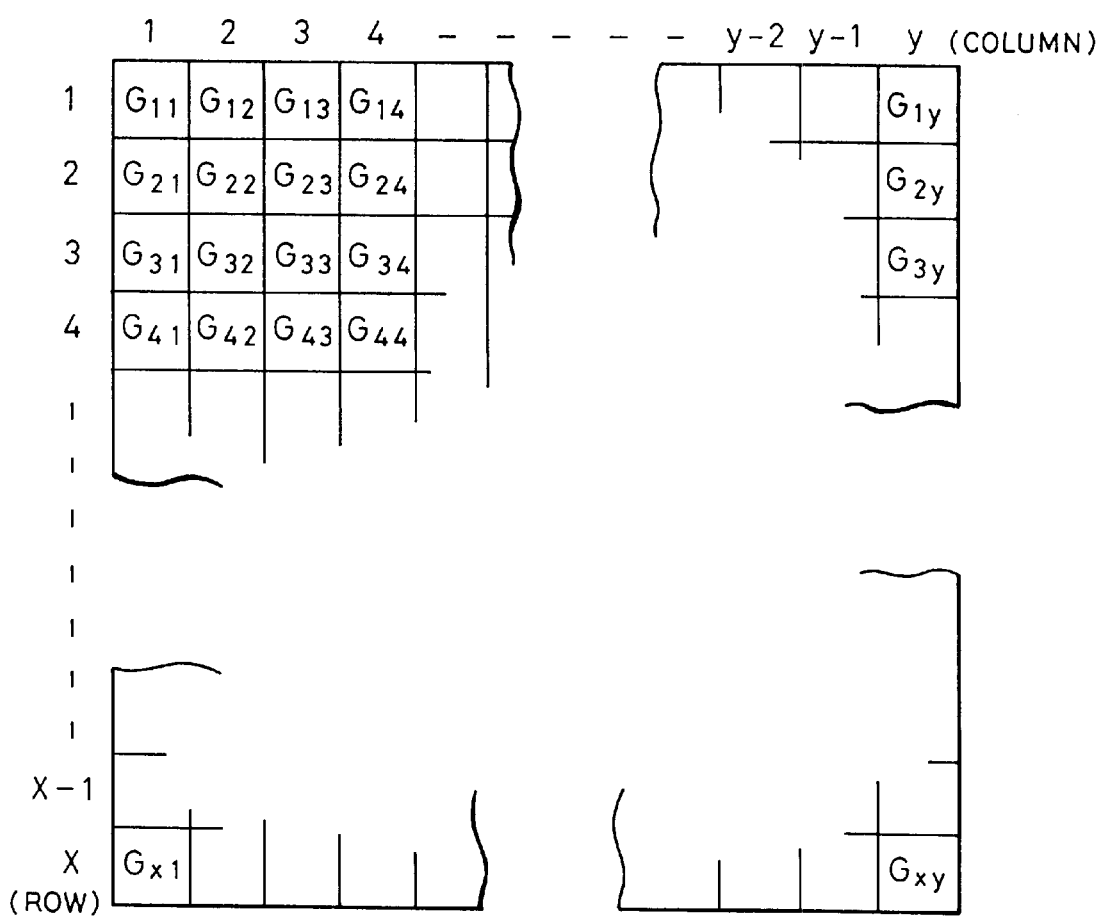
FIG. 3 is a diagram showing an example of the corresponding relation between a display picture and each pixel.

For example, as shown in FIG. 3, it is now assumed that pixel data samples corresponding to pixels $G_{11}$ to $G_{xy}$ on the display picture are labelled to $DS_{11}$ to $DS_{xy}$ and the pixel data samples of the nth frame and the pixel data samples of the (n−1)th frame are expressed as follows.

$DS(n)_{11}$ to $DS(n)_{xy}$: pixel data samples of the nth frame $DS(n-1)_{11}$ to $DS(n-1)_{xy}$: pixel data samples of the (n−1)th frame The subtractor 31 obtains the difference between each pixel data sample of the nth frame and each pixel data sample of the (n−1)th frame in the pixels corresponding to the pixels existing at the same position on the display picture. That is, the subtractor 31 obtains a difference value between $DS(n)_{11}$ and $DS(n-1)_{11}$, a difference value between $DS(n)_{12}$ and $DS(n-1)_{12}$, a difference value between $DS(n)_{13}$ and $DS(n-1)_{13}$, ..., a difference value between $DS(n)_{1y}$ and $DS(n-1)_{1y}$, a difference value between $DS(n)_{21}$ and $DS(n-1)_{21}$, a difference value between $DS(n)_{22}$ and $DS(n-1)_{22}$, ..., and a difference value between $DS(n)_{xy}$ and $DS(n-1)_{xy}$, and sequentially supplies them to the absolute value circuit 32.

The absolute value circuit 32 sequentially supplies the absolute values of the difference values to a comparator 33. The comparator 33 compares whether the above-mentioned absolute value of the difference between the pixel data sample of the nth frame and the pixel data sample of the (n−1)th frame is smaller than a predetermined value $T_{pi}$ or not. The absolute value circuit 32 generates a clock pulse CP and supplies it to a counter 34 so long as it is smaller than $T_{pi}$. The counter 34 counts the number of clock pulses CP supplied from the comparator 33 and supplies a count value to a comparator 35. In this instance, the counter 34 resets the count value to 0 each time the comparing process of one frame by the comparator 33 is finished. The comparator 35 compares whether the count value is larger than a predetermined value $T_{ra}$ or not. When it is larger than $T_{ra}$, the comparator 35 generates a second fade discrimination signal F2 at the logic level "1". When it is smaller than $T_{ra}$, the comparator 35 generates the signal F2 at the logic level "0". The comparator 35 supplies the signal F2 to the AND gate circuit 30.

That is, according to the construction comprising the subtractor 31, absolute value circuit 32, comparator 33, counter 34, and comparator 35, first, the absolute value of the difference between each pixel data sample in the nth frame and each pixel data sample in the (n−1)th frame is sequentially obtained with respect to the pixels existing at the spatially same position. The number of pixel data samples in each of which the absolute value is smaller than the predetermined value $T_{pi}$ is counted. Only when its count value is larger than a predetermined value $T_{ra}$, the second fade discrimination signal F2 at the logic level "1" is generated.

When both the first and second fade discrimination signals F1 and F2 are at the logic level "1", the AND gate circuit 30 produces a fade detection signal of the logic level "1" indicating that the image based on the video data $D_n$ is in the fade state. When at least one of the first and second fade discrimination signals F1 and F2 is at the logic level "0", the AND gate circuit 30 produces a fade detection signal of the logic level "0" indicating that the image based on the video data $D_n$ is not in the fade state.

That is, the fade detecting apparatus shown in FIGS. 1 and 2 realizes the fade detection by paying attention to a point that the image is in the fade state in the case where the following two conditions (1) and (2) are satisfied between the video data $D_n$ of one frame constructing the image and the delayed video data $D_{n-1}$ which is one-frame precedent thereto.

First fade discrimination signal F1: logic level "1"    (1)

The absolute value of the difference between the total luminance value of one frame in the video data $D_n$ and the total luminance value of one frame in the delayed video data $D_{n-1}$ is relatively large (larger than the predetermined value $T_{to}$).

Second fade discrimination signal F2: logic level "1"  (2)

The number of cases where the absolute value of the difference between each pixel data sample in the image data agent signal $D_n$ and each pixel data sample in the delayed video data $D_{n-1}$ is relatively small (smaller than the predetermined value $T_{pi}$) with respect to the pixels existing at the spatially same position is large (larger than the predetermined value $T_{ra}$).

According to the construction, if the video datas of two frames of the delayed video data $D_{n-1}$ and video data $D_n$ subsequent thereto are supplied, whether the fade has occurred on the image or not can be detected.

In the foregoing embodiment, the fade detection as mentioned above is performed by using the video data $D_n$ and the delayed video data $D_{n-1}$ which is one-frame precedent thereto. In place of the delayed video data $D_{n-1}$, the fade detection can be also similarly performed by using a video data $D_{n+1}$ which is one-frame subsequent thereto.

In brief, it is sufficient to perform the fade detection by executing the following processes by using the original video signal ($D_n$) and the neighboring video signal ($D_{n-1}$ or $D_{n+1}$) which is one-frame precedent or subsequent thereto.

That is, it is determined that the image based on the original video signal is in the fade state, in the case where the absolute value of the difference between the total luminance value of the original video signal of one frame and the total luminance value of the neighboring video signal of one frame which are neighboring just before or after the original video signal is relatively large, and the number of pixels in which the absolute value of the difference between each pixel data in the original video signal of one frame and each pixel data in the neighboring video signal is relatively small with respect to the pixels existing at the spatially same position is large.

In the embodiment, although the fade discriminating circuit 100 is constituted by the hardware as shown in FIG. 2, the corresponding operation can be realized by software.

Figure 4:
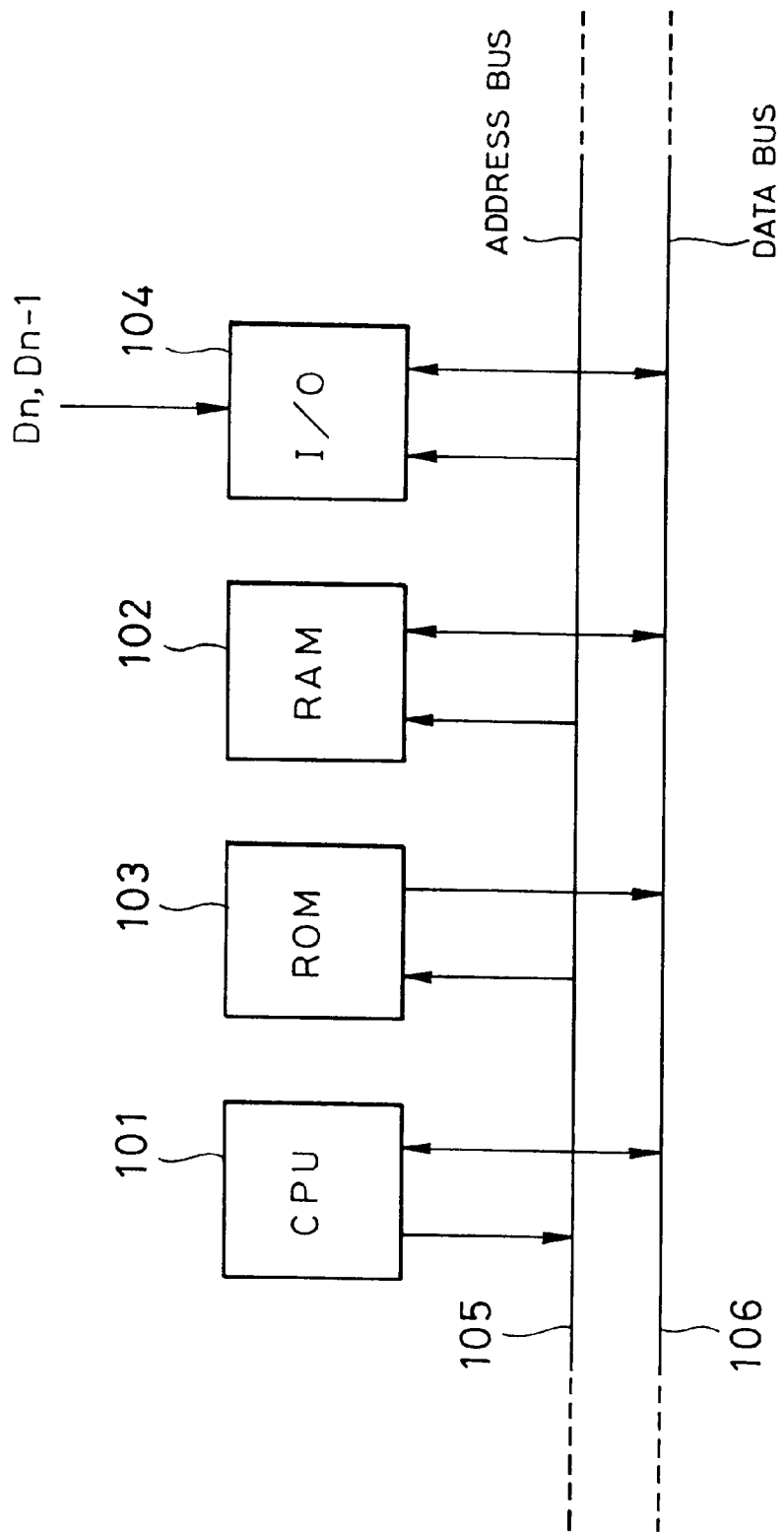
FIG. 4 is a diagram showing an example of a microcomputer in which the fade detecting method according to the present invention is implemented.

In this case, the fade discriminating circuit 100 is formed for example by a microcomputer shown in FIG. 4 which comprises a CPU (Central Processing Unit) 101, an RAM (Random Access Memory) 101, and an ROM (Read Only Memory) 102 mutually connected by an address bus 105 and a data bus 106. In FIG. 4, the reference numeral 104 represents an I/O interface which serves for inputting the video data and delayed video data to the microcomputer, for example, in such a way that the video data and the delayed video data are assigned to the upper bits and the lower bits of the data bus 106. The CPU 101 performs the fade detection by a procedure as shown in FIGS. 5 and 6 in accordance with the software previously stored in the ROM 103.

Figure 5:
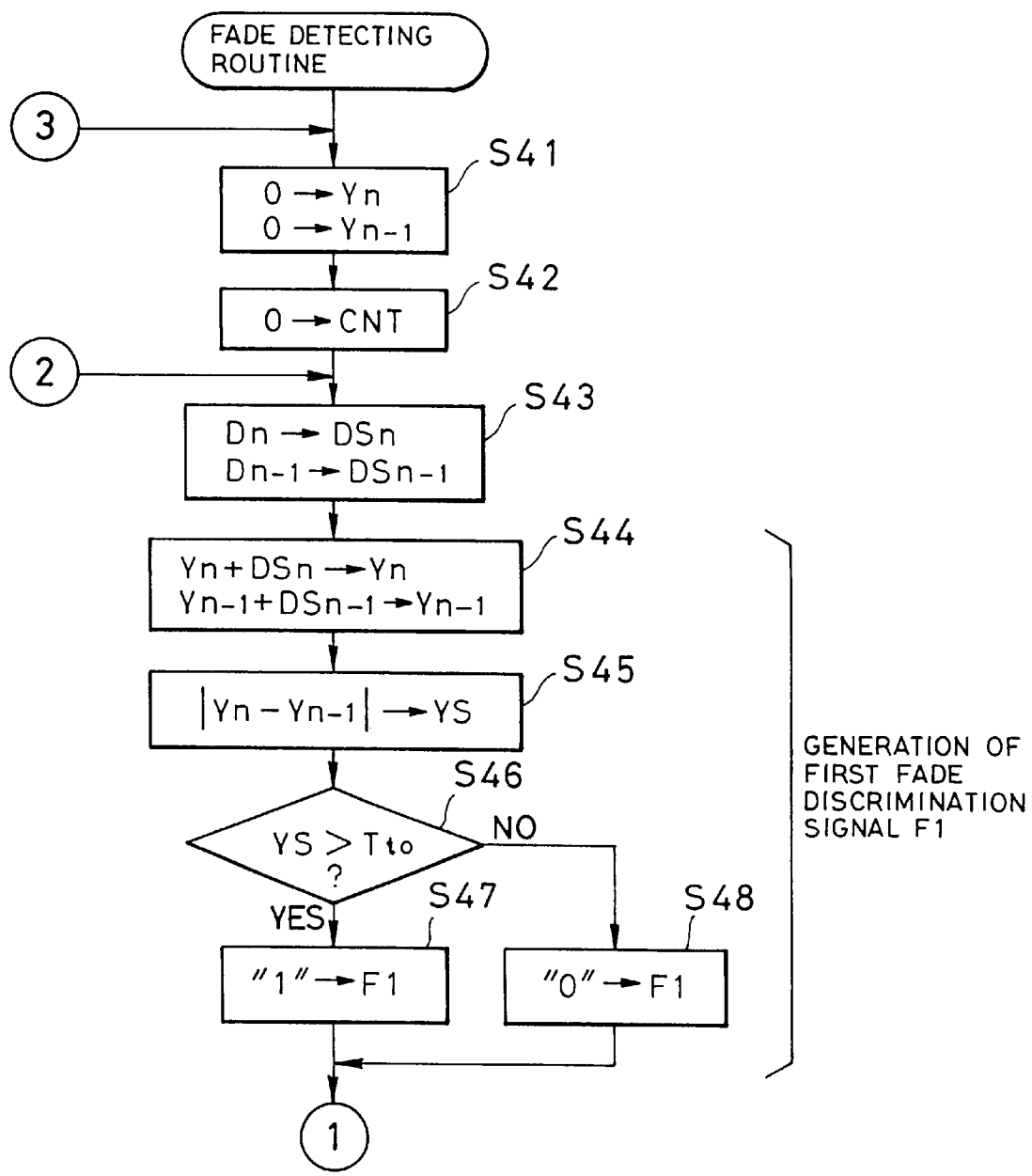
FIG. 5 is a diagram showing a fade detecting flow when the fade detection according to the invention is performed by ussing a software.
Figure 6:
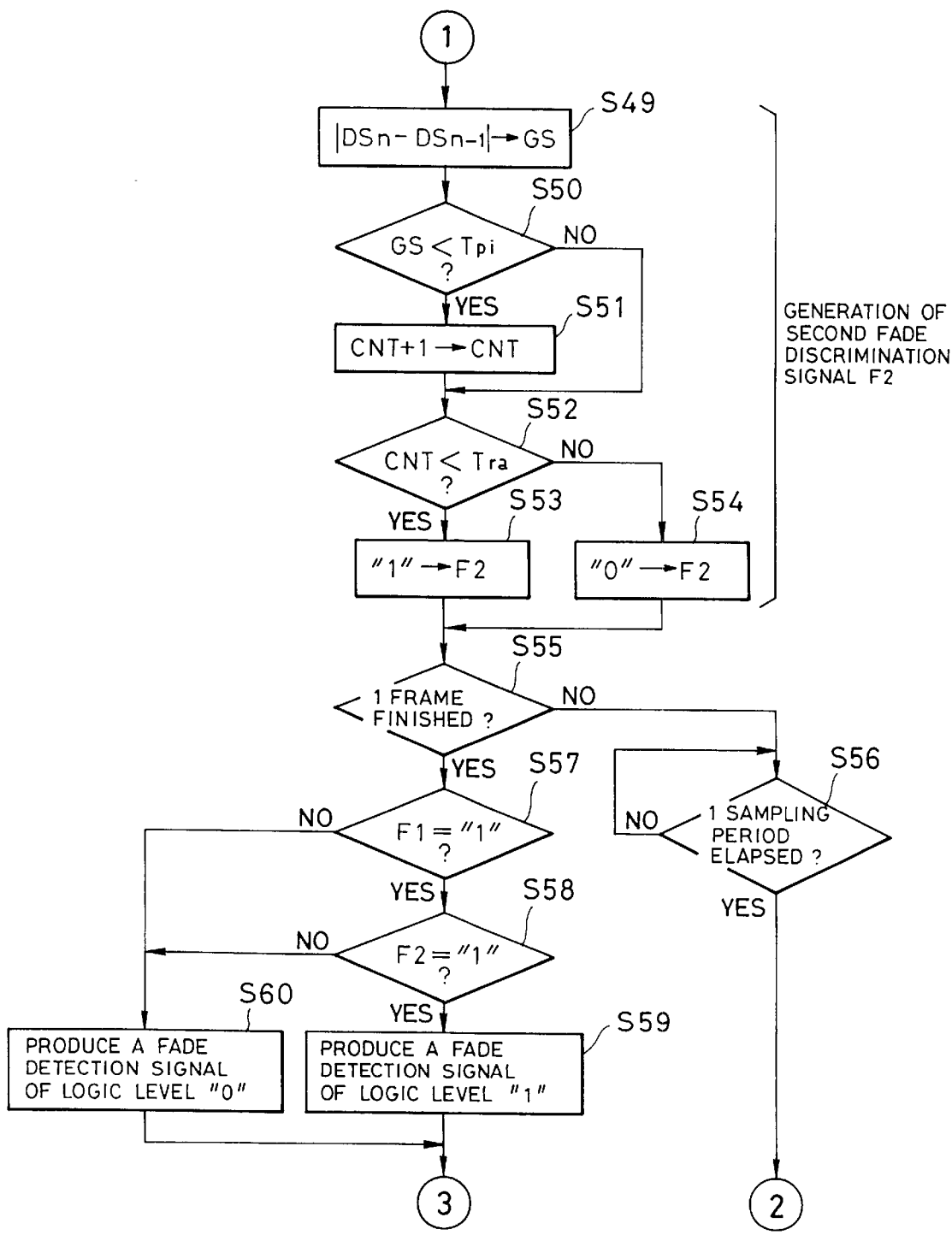
FIG. 6 is a diagram showing a fade detecting flow when the fade detection according to the invention is performed by using the software.

In FIG. 5, the CPU 101 first allows "0" to be stored into the RAM 102 as an initial value of each of the total luminance value $Y_n$ in all image data of the nth frame and the total luminance value $Y_{n-1}$ in all image data of the (n−1)th frame (step S41). Subsequently, the CPU 101 allows "0" to be stored into the RAM 102 as an initial value of a count value CNT (step S42).

The CPU 101 subsequently fetches one pixel data sample in the video data $D_n$, allows it to be stored into the RAM 102 as a pixel data sample $DS_n$, fetches one pixel data sample in the delayed video data $D_{n-1}$, and allows it to be stored into the RAM 102 as a pixel data sample $DS_{n-1}$ (step S43).

The CPU 101 now overwrites the total luminance values onto the RAM 102 in a manner such that the value obtained by adding the pixel data sample $DS_n$ to the total luminance value $Y_n$ is set to the new total luminance value $Y_n$ and the value obtained by adding the pixel data sample $DS_{n-1}$ to the total luminance value $Y_{n-1}$ is set to the new total luminance value $Y_{n-1}$ (step S44). After that, the CPU 101 calculates the absolute value between the total luminance values $Y_n$ and $Y_{n-1}$ and allows it to be stored into the RAM 102 as a luminance difference value YS (step S45). The CPU 101 discriminates whether the luminance difference value YS is larger than the predetermined value $T_{to}$ or not (step S46). When it is determined in step S46 that the luminance difference value YS is larger than the predetermined value $T_{to}$, the CPU 101 overwrites the logic level "1" into the area in the RAM 102 where the first fade discrimination signal F1 should be written (step S47). When it is determined in step S46 that the luminance difference value YS is not larger than the predetermined value $T_{to}$, the CPU 101 overwrites the logic level "0" into the area in the RAM 102 where the first fade discrimination signal F1 should be written (step S48).

After completion of steps S47 or S48, the CPU 101 calculates the absolute value of the difference between the pixel data samples $DS_n$ and $DS_{n-1}$ fetched in step S43 and allows it to be stored as a pixel difference value GS in the RAM 102 (step S49). The CPU 101 discriminates whether the pixel difference value GS is smaller than the predetermined value $T_{pi}$ or not (step S50). When it is determined in step S50 that the pixel difference value GS is smaller than the predetermined value $T_{pi}$, the CPU 101 overwrites the logic level "1" into the area in the RAM 102 where the second fade discrimination signal F2 should be written (step S53). When it is determined in step S52 that the pixel difference value GS is not smaller than the predetermined value $T_{pi}$, the CPU 101 overwrites the logic level "0" into the area in the RAM 102 where the second fade discrimination signal F2 should be written (step S54).

When step S53 or S54 is finished, the CPU 101 discriminates whether the processes for one frame have been finished or not (step S55). When it is decided in step S55 that the processes for one frame are not finished, the CPU 101 executes a discrimination about whether the one sample period has elapsed from the end of the fetching of the pixel data samples $DS_n$ and $DS_{n-1}$ or not in step S43 until the one sample period elapses (step S56). When the elapse of the one sample period is determined in step S56, the CPU 101 returns to the execution in step S43 and repetitively executes a series of operations as mentioned above.

When it is decided in step S55 that the processes for one frame have been finished, the CPU 101 discriminates whether the first fade discrimination signal F1 is at the logic level "1" or not (step S57). When it is determined in step S57 that the first fade discrimination signal F1 is at the logic level "1", the CPU 101 discriminates whether the second fade discrimination signal F2 is at the logic level "1" or not (step S58). When it is determined in step S58 that the second fade discrimination signal F2 is at the logic level "1", namely, when it is decided that both the first and second fade discrimination signals F1 and F2 are at the logic level "1", the CPU 101 produces the fade detection signal of the logic level "1" (step S59). When it is determined in step S57 that the first fade discrimination signal F1 is not at the logic level "1" or when it is decided in step S58 that the second fade discrimination signal F2 is not at the logic level "1", the CPU 101 produces the fade detection signal of the logic level "0" (step S60). After completion of step S59 or S60, the CPU 101 returns to the execution in step S41 and repetitively executes the operations as mentioned above.

In the process shown in FIGS. 5 and 6 mentioned above, at first, by repetitively executing the operations in steps S43 to S48, the first fade discrimination signal F1 as shown in FIG. 2 is obtained. Then, by repetitively executing the operations in steps S49 to S54, the second fade discrimination signal F2 is obtained. When it is determined in steps S57 and S58 that both the first and second fade discrimination signals F1 and F2 are at the logic level "1", the CPU 101 generates the fade detection signal at the logic level "1" indicating that the image is in the fade state.

In the invention as mentioned above, when the absolute value of the difference between the total luminance value of the original video signal of one frame and the total luminance value of the neighboring video signal of one frame which are neighboring just before or just after the original video signal is relatively large and the number of pixels in which the absolute value of the difference between each pixel data in the original video signal of one frame and each pixel data in the neighboring video signal is relatively small with respect to the pixels existing at the spatially same position is large, it is determined that the image based on the original video signal is in the fade state.

According to the invention, since whether the image is in the fade-in or fade-out state or not can be detected based on the video signal of two frames continuously supplied, the high speed image process can be performed in real-time.

What is claimed is:

1. A fade detecting method of a video signal for detecting a fade-in or fade-out state of an image from an original video signal constructed by a series of pixel data corresponding to pixels of a picture, comprising:

a first fade discrimination step of obtaining an absolute value, as a first difference absolute value, of a difference between a total luminance value of said original video signal of one frame and a total luminance value of neighboring video signal of one frame which are neighboring just before or just after said original video signal, and discriminating whether said first difference absolute value is larger than a first predetermined value or not;

a second fade discriminating step of obtaining an absolute value, as a second difference absolute value, of a difference between each pixel data in said original video signal and each pixel data in said neighboring video signal with respect to pixels existing at a spatially same position and discriminating whether said second difference absolute value is smaller than a second predetermined value or not; and a third fade discriminating step of discriminating whether the number of pixels in which said second difference absolute value is smaller than the second predetermined value is larger than a predetermined number or not;

a fade detecting step of determining that said fade-in or fade-out has occurred when it is determined in said first fade discriminating step that said first difference absolute value is larger than said first predetermined value it is determined in said second fade discriminating step that said second difference absolute value is smaller than said second predetermined value, and it is determined in said third fade discrimination step that the number of pixels in which said second difference absolute value is smaller than said second predetermined value is larger than said predetermined number.

2. A fade detecting apparatus of a video signal for detecting a fade-in or fade-out state of an image from an original video signal constructed by a series of pixel data corresponding to pixels of a picture, comprising:

delay means for obtaining a delayed original video signal by delaying said original video signal by one frame period;

first subtracting means for obtaining, as a first difference absolute value, an absolute value of a difference between a total luminance value of said original video signal of one frame and a total luminance value of said delayed original video signal;

first comparing means for comparing whether said first difference absolute value is larger than a first predetermined value or not;

second subtracting means for obtaining, as a second difference absolute value, an absolute value of a difference between each pixel data in said original video signal of one frame and each pixel data in said delayed original video signal with respect to pixels existing at a spatially same position;

second comparing means for detecting that said second difference absolute value is smaller than a second predetermined value;

counting means for obtaining a count value by counting the number of pixels in which it is detected by said second comparing means that said second difference absolute value is smaller than said second predetermined value;

third comparing means for comparing whether said count value is larger than a predetermined number or not; and means for generating a fade detection signal showing that said fade-in or fade-out has occurred on said image when it is determined by said first comparing means that said first difference absolute value is larger than said first predetermined value and it is determined by said third comparing means that said count value is larger than said predetermined number.

* * * * *